United States Patent [19]

Dale et al.

[11] 3,996,160

[45] Dec. 7, 1976

[54] HYDROQUINONOID ORTHO-ALKYLATION POLYMERS AND THE PROCESS OF THEIR PRODUCTION

[75] Inventors: James A. Dale, Menlo Park; Patricia C. Wang, Palo Alto, both of Calif.

[73] Assignee: Dynapol Corporation, Palo Alto, Calif.

[22] Filed: Feb. 24, 1975

[21] Appl. No.: 552,017

[52] U.S. Cl. ............................ 252/404; 260/47 R; 260/47 UA; 260/62
[51] Int. Cl.$^2$ .................... C09K 15/08; C08F 12/24
[58] Field of Search ............ 260/47 R, 47 UA, 62; 252/404; 426/545, 546

[56] References Cited
UNITED STATES PATENTS

| | | | |
|---|---|---|---|
| 2,682,563 | 6/1954 | Bell | 252/404 |
| 2,694,693 | 11/1954 | Minsk | 260/47 UA |
| 2,700,029 | 1/1955 | Cassidy | 260/47 UA |
| 2,710,801 | 6/1955 | Minsk | 260/62 |
| 2,735,837 | 2/1956 | Minsk | 260/62 |
| 2,831,898 | 8/1958 | Ecke | 260/624 |
| 2,832,808 | 4/1958 | Zerbe | 260/62 |
| 2,906,736 | 9/1959 | Cassidy | 260/47 UA |
| 3,004,953 | 10/1961 | Sonnabend | 260/62 |
| 3,165,495 | 1/1965 | Taylor | 260/47 R |
| 3,328,489 | 6/1967 | Murdock | 260/897 |
| 3,457,328 | 7/1969 | Blatz | 260/47 UA |
| 3,546,173 | 12/1970 | Hunt | 260/62 |
| 3,645,970 | 2/1972 | Kleiner | 260/47 UA |
| 3,758,597 | 9/1973 | Buysch | 260/613 R |

Primary Examiner—Samuel W. Engle
Assistant Examiner—Donald P. Walsh
Attorney, Agent, or Firm—William H. Benz

[57] ABSTRACT

Hydroquinonoid polymers having $n$ recurring units of the General Structural Formula

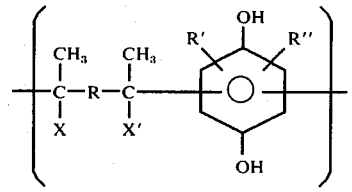

wherein $n$ is 3 or greater, X and X' independently are hydrogen or methyl, R is a lower hydrocarbon, and R' and R'' independently are lower hydrocarbons or hydrogens are disclosed as well as such polymers additionally containing phenolic copolymerizates. The preparation of these polymers by the one step copolymerization of a diolefinic hydrocarbon, a hydroquinonoid and optionally a phenolic, in the presence of an ortho-alkylation catalyst, and the use of these polymers as antioxidants, especially for foodstuffs, is also disclosed.

24 Claims, No Drawings

HYDROQUINONOID ORTHO-ALKYLATION POLYMERS AND THE PROCESS OF THEIR PRODUCTION

BACKGROUND OF THE INVENTION

Field of the Invention

This invention relates to hydroquinonoid group-containing polymers and their preparation. More particularly, it relates to ring polymerized hydroquinonoid polymers having antioxidant activity for foods and other oxygen-degradable materials and their preparation.

The Prior Art

Hydroquinonoid compounds, that is compounds having a 1,4-dihydroxybenzene structure, are well known. It is also known to be desirable to form polymers containing hydroquinonoids. These polymers find use as structural polymers, photographic film components and as oxidation inhibitors. One route to hydroquinonoid polymers which received attention as early as the nineteen forties involved condensing hydroquinone with an aldehyde such as formaldehyde in the presence of mineral acids to yield an insoluble, infusible resin having a crosslinked structure.

Another route to hydroquinonoid polymers developed in the nineteen forties and fifties involved free radical polymerizing an alkenylhydroquinone such as vinylhydroquinone either alone or with vinyl group-containing comonomers such as styrene or crosslinkers such as divinylbenzene. This route gives rise to materials having a structure

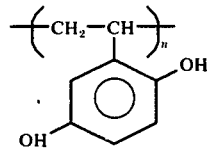

wherein the hydroquinonoid groups are pendant from the polymer backbone.

A further route to hydroquinonoid polymers developed in the nineteen sixties employs Friedel Crafts catalysis to add hydroquinonoids to preformed polymers and copolymers, once again in a pendant configuration. For example, if poly(chloromethylstyrene) is the starting polymer, the hydroquinonoid product has a structure

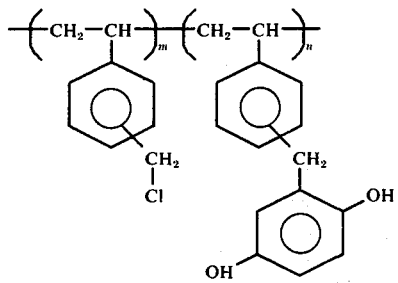

wherein the relative values for $m$ and $n$ depend upon the degree of halogen substitution on the backbone polymer.

STATEMENT OF THE INVENTION

We have now discovered a new process of preparing hydroquinonoid polymers. The products of this process are believed to be new materials, as well. In the preparation process of this invention a hydroquinonoid polymer is formed by contacting a diolefinic hydrocarbon with a hydroquinonoid and effecting alkylation reaction at a temperature of from 80° C to 250° C in the presence of a catalytically effective amount of an ortho-alkylation catalyst. The diolefinic hydrocarbon may be represented by General Structural Formula I

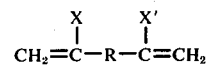

and the hydroquinonoid may be represented by General Structural Formula II

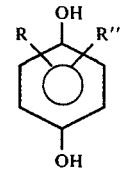

wherein X and X' independently are selected from the group consisting of hydrogen and methyl; R is a hydrocarbon selected from the group consisting of alkyls of from 1 to 6 carbons and aryls, aralkyls and alkaryls of from 6 to 14 carbons; and R' and R'' independently are selected from the group consisting of hydrogen, lower alkyls of from 1 to 6 carbon atoms and aralkyls of from 8 to 12 carbon atoms. The polymer product formed from the starting materials so represented itself will have recurring units of the structure shown in General Structual Formula III

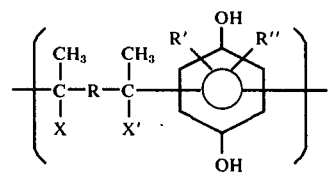

If desired, other components such as phenolics may be present during the reaction and incorporated into the polymer product.

DETAILED DESCRIPTION OF THE INVENTION

In accordance with the process of this invention, a diolefinic hydrocarbon is reacted with a hydroquinonoid in the presence of a hydroxybenzene ortho-alkylation catalyst under alkylation conditions to yield a polymer product.

The Diolefinic Hydrocarbon Reactant

The diolefinic reactant, as represented in Formula I, is a hydrocarbon having the formula

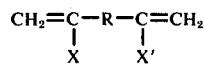

wherein X and X' independently are hydrogen or methyl, R is a lower alkyl of from 1 to 6 carbon atoms, or an aryl, alkaryl or aralkyl of from 6 to 14 carbon atoms. The diolefins have their olefinic groups in terminal positions rather than in internal positions. They may contain additional unsaturation beyond the two olefinic unsaturations in the form of aromatic rings, but otherwise are saturated.

Thus, typical diolefins include the lower alkadienes, both linear and branched such as, 1,4-pentadiene, 1,5-hexadiene, 3-ethyl-1,5-hexadiene, 1,8-nonadiene and 3,5-dimethyl-1,7-octadiene; the diolefinic aryls, 1,4-diisopropenylbenzene and 1,3-diisopropenylbenzene, 1,4-divinylbenzene and 1,3-divinylbenzene; the diolefinic alkaryls 2-methyl-1,4-divinylbenzene, 2-isopropyl-1,3 or 1,4-divinylbenzene, 2-t-butyl-1,4-divinylbenzene, 2,3-dimethyl-1,4-divinylbenzene and 2,5-di-t-butyl-1,4-divinylbenzene; and the aralkyls 1-vinyl-4-(propyl-2-ene)benzene and 1-vinyl-3-(butyl-3-ene)-benzene. These are merely illustrative and should not be interpreted as limiting the diolefin employed. Combinations of two or more diolefins can be employed, if desired. Butadiene, a very common diolefin, is not included within the definition of suitable diolefins. Butadiene does not work smoothly as a linking diolefin. This is believed to be due to the fact that butadiene, after attaching to one hydroquinone ring, is of a size to readily undergo cyclization into a five membered ring with the hydroquinolic hydroxyl and that this occurs preferentially to the desired linking. With this problem in mind, other diolefins which clearly can lead to simple five or six membered ring cyclization such a 2-methyl-1,3-butadiene or the like should probably be avoided.

Preferred among the diolefinic compounds are those compounds in accordance with Formula I wherein X and X' are hydrogen and R is an aryl or an alkaryl of from 6 to 14 carbons inclusive. Preferred among these are the divinylbenzenes including 1,4- and 1,3-divinylbenzene and the 1,4- and 1,3-divinylbenzenes which carry 1 or 2 alkyl ring substituents each of from 1 to 4 carbons inclusive such as 2-methyl-1,4- or 1,3-divinylbenzene, 2-t-butyl-1,4 or 1,3-divinylbenzene and 2,5-di-t-butyl-1,4 or 1,3-divinylbenzene. Most preferred diolefins include 1,4- and 1,3-divinylbenzene and mixtures thereof.

Divinylbenzene is a refinery product available in several degrees of purity. Dow Chemical Company currently markets 50% and 75% pure materials. Both of these materials contain diethylbenzene and/or ethylvinylbenzene as major diluents and minor amounts of naphthas, heavy ends, and other unidentified hydrocarbons which distill with divinylbenzene. Shell Oil Company has available as a developmental chemical a 95+% pure grade of divinylbenzene, containing the same impurities but in smaller amounts. Also, it is possible, if desired, to increase the divinylbenzene content of any of these materials up to essentially 100% purity by extractive distillation and other techniques known to the art.

Most surprisingly, however, it is not necessary (or even desirable) to use high purity (such as 95% or greater purity) divinylbenzene. Any of these grades can be used with material containing 10 to 50% of non-diolefinic impurities being preferred. In virtually all other reactions where divinylbenzene is employed as a polymer linking agent, use of the impure divinylbenzenes results in rapid chain termination and very low molecular weight. With the other diolefins as well, it is acceptable to use material containing up to say 50%, i.e., from 0 to 50%, by weight of non-diolefinic impurities and preferred to use diolefinic materials containing from 10 to 50% of non-diolefinic materials.

The Hydroquinonoid Reactant

The hydroquinonoid reactant, as represented by Formula II, is a 1,4-dihydroxybenzene selected from the group consisting of 1,4-dihydroxybenzene(hydroquinone) itself and alkyl-and-aralkyl-substituted 1,4-dihydroxybenzenes, wherein the alkyl groups have from 1 to 6 carbons inclusive and the aralkyls have from 8 to 12 carbons inclusive. Suitable hydroquinoid compounds contain at most two such alkyl or aralkyl substituents, at least two sites on the hydroquinoid benzene ring remaining unsubstituted so that ring alkylation by the diolefinic hydrocarbon can occur at at least two sites, thereby yielding polymerization in accordance with this invention. Suitable hydroquinonoid reactants include, for example, 1,4-dihydroxybenzene, 2,3- or 2,5- or 2,6-dimethyl-1,4-dihydroxybenzene, 2-ethyl-1,4-dihydroxybenzene, 2-t-butyl-1,4-dihydroxybenzene, 2-methyl-5-t-butyl-1,4-dihydroxybenzene, 2-(2-phenylethyl)-1,4-dihydroxybenzne, and 2,4-di(2-(4-vinyl) phenylethyl)-1,4-dihydroxybenzene. Preferred hydroquinonoid reactants include hydroquinone and 1,4-dihydroxybenzenes carrying one lower branched or linear alkyl group of from 1 to 5 carbon atoms. Such preferred materials may be further defined as being in accordance with Formula II wherein R' is hydrogen and R'' hydrogen or a 1 to 5 carbon atom alkyl. Hydroquinone, 2-methyl-, 2-t-amyl- 2-t-butyl-1,4-dihydroxybenzene are most preferred hydroquinonoid reactants. Mixtures of two or more hydroquinonoid reactants may be employed.

The Optional Phenolic Reactant

While it is very suitable to react a diolefinic hydrocarbon with a hydroquinonoid reactant to yield a polymer product, it is often desirable to incorporate phenolic reactant in the reaction mixture and reaction product. Phenolic may be added for cost reasons, being lower in price than the primary reactants, or it may be added so as to vary or improve the properties of the polymer product.

Suitable phenolics are those monohydroxybenzenes having 2 replaceable aromtic hydrogens ortho to the phenolic hydroxyl. They thus may be represented by Formula IV

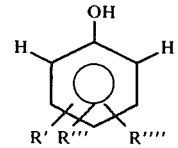
IV wherein R' and R''' independently are selected from the group consisting of hydrogen, lower alkyls of from 1 to 6 carbon atoms inclusive and aralkyls of from 8 to 12 carbon atoms inclusive and R'''' is independently selected from the group consisting of hydrogen and 1 to 12 carbon atoms inclusive alkyls. Examples of phenolic reactants are phenol, the cresols (i.e., 3- or 4-methylphenol), 3-methyl-4-t-butylphenol, 3- or 4-t-butylphenol, nonylphenol (generally available as a mixture of isomers), 3- or 4-[1-(4-ethyl)phenylethyl]phenol; 3-t-butyl-4[1-phenylethyl]phenol and the like. Mixtures of such phenols may be employed as well.

Generally, phenolics wherein R' and R''' are hydrogen and R'''' is hydrogen or a 1 to 12 carbon atoms alkyl are preferred with most preferred phenolics consisting of phenol, cresol, 3,4-dimethylphenol, 4-ethylphenol, 4-t-butyl- and 4-n-butylphenol, and bisphenol-A.

Ortho-Alkylation Catalyst

A catalyst is employed to effect reaction between the hydroquinonoid and diolefinic compounds. This catalyst may be any of the materials known to catalyze the ring alkylation of hydroxybenzenes in the ortho position. Such materials include for example, the metal phenolates described by Ecke and Kolka in U.S. Pat. No. 2,831,989 issued April 22, 1958 i.e., phenoxy derivatives of Al, Mg, Fe, Zn, P, As, Sb, Bi and Sn; the polymeric or supported aluminum alcoholates set forth by Yeakey et al in U.S. Pat. No. 3,733,365 issued May 15, 1973; the aluminum mixed salts described by Hokama in U.S. Pat. No. 3,267,154 issued August 16, 1966; and the metals of the 5th and 6th Periods of Groups IV-B and V-B taught by Leston in his U.S. Pat. No. 3,331,879 issued July 18, 1967, i.e., Zr, Hf, Nb and Ta. Aluminum is a preferred catalytic material. The exact form of its addition is believed to not be critical. It is considered, but not known with certainty that the aluminum, whether added initially as metal, as a salt such as aluminum isopropoxide or butoxide or as a complex such as triethyaluminum or the like, reacts with the hydroquinonoid reactant and, if present, the optional phenolic to yield as actual active species, the corresponding aluminum hydroquinonate and phenolate. A similar conversion likely occurs in the case of other catalysts useful herein. Most preferred catalysts are the aluminum hydroquinonates and phenolates corresponding to the hydroquinonoid and phenolic reactants.

The Preparation Process Conditions

In accord with the present invention, a diolefinic reactant as is shown in General Formula I is contacted with a hydroquinonoid compound such as is shown in General Formula II in the presence of an ortho-ring alkylation catalyst and a reaction is effected to yield a polymer product. Optionally a phenolic reactant as shown in General Formula IV is present as well and incorporated into the final product. The preparation reaction is carried out under ortho-ring alkylation conditions. Such conditions may be summarized as being in liquid phase, preferably in a liquid reaction solvent; being at elevated temperature; being for a relatively long period of time such as for at least an hour and being in the presence of an effective amount of a catalyst for alkylation of hydroxyaromatic rings in the ortho position.

As solvent for the reaction are preferably employed organic liquids having an essentially aprotic character. Ethers, aromatic hydrocarbons and cycloaliphatic hydrocarbons are representative of suitable solvents. Examples of suitable solvents include lower aliphatic ethers such as diethyl ether, diisopropyl ether, and di-n-butyl ether; other ethers such as tetrahydrofuran, glyme (1,2-dimethyoxyethane), diglyme, anisole, diphenyl ether and phenetole, and the aromatic and cyloaliphatic liquid hydrocarbons of up to about 12 carbon atoms such as the xylenes, mesitylene, ethylbenzene, pseudocumene, benzene, cyclohexane, diethylcyclohexane and the like. Preferred solvents include di-n-butyl ether, xylenes and trimethylbenzenes, with mixtures of ethers and alkyl-aromatic hydrocarbons being more preferred. Mixtures of 5 to 25% ethers with aromatic hydrocarbons, especially xylenes, are most preferred solvents.

The preparation reaction is carried out at elevated temperatures such as 80° C or above. Generally temperatures of from about 80° C to about 250° C are usable, with temperatures of from about 100° C to about 200° C being preferred. It is often convenient to employ the reflux temperature of the solvent system as the reaction temperature. Such temperatures range from about 100° C to about 180° C at atmospheric pressure. Superatmospheric pressures may be employed if it is desired to use temperatures above the atmospheric reflux point.

The reaction times employed to effect production of the present hydroquinonoid polymers are inversely dependent upon the reaction temperature employed. Generally times of from about 1 hour to about 48 hours are employed, with times of from about 2 hours to about 20 hours being preferred.

The relative amounts of reactants and catalyst are controlled. The molar ratio of diolefinic hydrocarbn reactant to total hydroquinonoid reactant plus optional phenolic reactant can range from about 1:2 to about 2:1 and preferably ranges from about 1:1.5 to about 1.5:1. In general, product average molecular weight increases as the ratio of diolefinic hydrocarbon to hydroquinonoid plus phenolic increases above 1:1. Gross excesses of diolefinic reactant are to be avoided as they can lead to formation of undesired diolefin homopolymer products. Generally, ratios of from about 1:1 to about 1:1.5 give best results.

The molar ratio of hydroquinonoid reactant to phenolic reactant can be 1:0 in view of the optional nature of the phenolic reactant and it can also range to a value of about 1:10. If the mole ratio of hydroquinonoid to phenolic is maintained between about 1:0 and about 1:1, however, an unexpected advantageous property is observed. Within this range the product has essentially uniform antioxidant activity. Since phenolics are generally of lower cost than hydroquinonoids, this enables a lower priced product to be made. As phenolic content is increased beyond this range, there is a gradual drop in antioxidant activity to a level consistent with phenolic antioxidants. When making polymers of this invention for use as antioxidants, it is most preferred to maintain the ratio of hydroquinonoid to phenolic reactants between about 10:1 to about 1:1.

A catalytically effective amount of catalyst is employed which amount may range from about 0.001 moles of catalyst per mole of diolefinic hydrocarbon up to about 0.1 moles of catalyst per mole of diolefinic hydrocarbon. Larger amounts can be employed but are not seen to offer any advantages. Preferred amount of catalyst range from about 0.005 moles of catalyst per mole of diolefinic hydrocarbon to about 0.075 moles of catalyst per mole of diolefinic hydrocarbon reactant.

The initial and maximum concentration of reactants in the reaction solvent should be controlled from about 0.1 to about 20 moles of diolefinic hydrocarbon per liter of solvent and preferably is from about 3 to about 20 moles per liter.

The reaction mixture should be stirred during the reaction. The reaction can be carried out batchwise or with continuous feed of one or more of all of the feedstocks and continuous removal of product.

In a batch mode, especially if the ortho-alkylation catalyst is formed in situ in the reaction mixture, it is desirable to contact the catalyst or precursor with the hydroquinonoid and optical phenolic reactants and solvents at or about the reaction temperature for a brief period, such as from 0.01 to 2 hours, preferably 0.02 to 2 hours, prior to adding the diolefinic reactant.

The product can be isolated by dilution with additional solvents and precipitation with non-solvents, or by washing with aqueous acid to remove the catalyst and thereafter extracted with water to remove residual acid. The polymer product may be fractionated into molecular weight cuts, if desired. Typical product work up schemes are illustrated more fully in the Examples.

The Polymer Product

The polymer products of this invention have recurring diolefin-hydroquinonoid units structurally depicted by General Structural Formula III

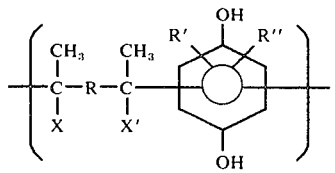

wherein X, X', R, R' and R'' are as already defined. "Recurring" as used herein is defined as "repeating-optionally after incorporation of other polymerizable units". When an optional phenolic reactant is present, the products will contain, as well, recurring phenolic units depicted by General Structural Formula V

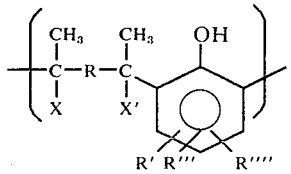

wherein X, X', R, R', R''' and R'''' are as already defined. This lends to an overall polymer product having a structure as illustrated in General Structural Formula VI

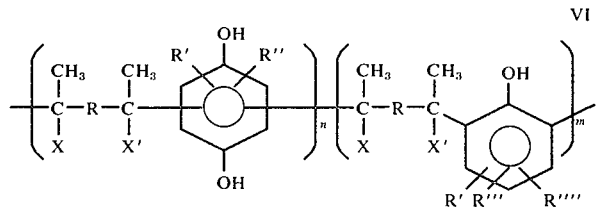

It should be noted that in the case of products containing no phenolic reactant, the product is essentially an alternating diolefin-hydroquinonoid copolymer. When phenolic is present the product is an alternating diolefin-hydroxyaromatic polymer. However, there is no special ordering between the phenolic and hydroquinonoid components, to wit, the product does not necessarily have regular alternation in its structure between phenolic and hydroquinonoid groups.

The polymer product is depicted in General Structural Formula VI as a linear polymer. It is believed that the polymer product is of a substantially linear structure, however, the definitions of the R' and R'' substituents on the hydroquinonoid and phenolic components of the polymer allow for additional alkylation of these components by additional diolefinic groups. Such additional alkylation could lead to formation of a limited number of branches, say up to one branch for every four hydroxy-aromatic rings in the polymer product backbone.

In view of the solubility properties of these polymer products in organic liquids, it is considered that there is very little crosslinking alkylation between polymer product chains by the diolefinic hydrocarbon. Also, in view of viscosity data from solutions of the polymer product, it is considered that the polymer product, while not purely linear, is not highly branched.

The polymer product contains $n$ recurring hydroquinonoid structural units of the type shown in General Structural Formula III. $n$ Has a value of from about 3 to about 1000, preferably from about 3 to about 100. The product optionally also contains $m$ phenolic structural units as shown in General Structural Formula V. $m$ May range from about 3 to 1000 as well with $m$'s of from 3 to 100 being preferred. The ratio of $n$ to $m$, hence the mole ratio of hydroquinonoid to phenolic components, can range from 1:0 (since the phenolic is optional) to 1:10, preferably the ratio of $n$ to $m$ is from 1:0 to 1:1.

Use of the Polymer Products as Antioxidants

The present materials are useful as antioxidants. When they are admixed with oxidizable substances such as plastics, rubbers, or deterioration-prone foodstuffs in an amount of from about 2 to 50,000 parts per million by weight (basis oxidizable substance) they function to retard oxidation of the substances. In rubbers and plastics these materials offer the advantage of being substantially nonvolatile and thus unlikely to be lost by vaporization. They are also less likely to migrate through these substrates. In oxidizable consumables, such exemplified by pharmaceuticals, vitamins and food products and food components such as edible oils, fats, essential oils, nuts and flavorings, an effective amount of these antioxidant materials, such as from 2 to 10,000 parts per million by weight or preferably from 5 to 1000 parts per million by weight, is generally employed. In such use, the high molecular weight and concomitant low migration and volatility greatly enhance product possessing such as by reducing steam distillation of the antioxidants and eliminating the need to continually add additional antioxidant to compensate for the loss. Also, the antioxidants of this invention because of their large molecular size present the advantage of nonabsorptivity through the walls of the gastrointestinal tract, thereby eliminating any risk of toxicity.

When used as antioxidants for oxidizable substances, these materials are intimately admixed with the oxidizable substance such as by being dissolved in the oxidiable substance, by being mixed as solid particles through the oxidizable substance, by being added as a solution in a suitable carrier, or the like.

The materials of this invention, their production and their use are further illustrated in the following Examples. These are intended only to demonstrate the invention and are not to be construed as limiting its scope, which scope is instead defined by the appended claims.

EXAMPLE I

Aluminum isopropoxide (204 mg, 1 mmole), hydroquinone (3.3 g, 30 mmole) and about 20 ml of distilled xylene were combined and heated in a 130°–140° C oil bath. After 10 minutes, the reaction vessel was evacuated to strip off isopropyl alcohol formed in the reaction of the isopropoxide with hydroquinone. After 45 minutes, 3.9 g (23 mmoles) of divinylbenzene (75% pure) was added and the mixture heated to reflux temperature (160°–165° C) and there maintained overnight. A solid glassy mass formed which dissolved in the organic layer of an ether and 1N hydrochloric acid mixture. The organic layer was extracted with aqueous sodium hydroxide until the aqueous phase was clear, extracted with saturated sodium bicarbonate and water and then dried. The organic phase was evaporated to dryness to yield an organic residue which was analyzed by NMR, infrared analysis, and hydroquinone content titration and shown to be consistant with Structural Formula VII

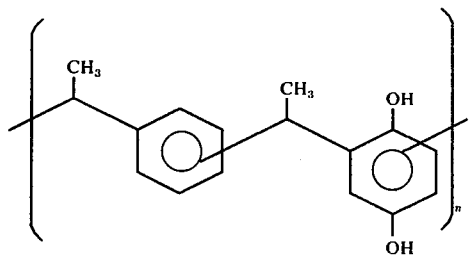

The product (I) was analyzed by gel permeation chromatography relative to a series of polystyrene materials of known molecular weight, and by such analysis shown to have a peak molecular weight corresponding to 1,300 molecular weight polystyrene (i.e., $n$ equals about 6). This method of determining molecular weights was checked using a universal calibration technique and found to yield values at worst ± 20% of true values.

EXAMPLE II

Aluminum metal (13.5 mg, 0.5 mmole), p-cresol (204 mg, 1.9 mmole) and about 1.5 ml of p-xylene were heated in a 160°–170° C oil bath until all the metallic aluminum reacted to form an aluminum-cresol complex. About 15 ml additional p-xylene, 1.68 g (15 mmole) of hydroquinone, and 2.5 ml of diisopropyl ether were added and the mixture was refluxed for about 2 hours. Then 2.23 g of 75% pure divinylbenzene (about 13 mmoles) was added and the mixture was refluxed for 22 hours (at 128°–130° C) to yield a gumlike material and an almost colorless liquid. The gumlike material was dissolved in a 1N hydrochloric acid/diethyl ether and combined with the liquid in a separatory funnel. The organic phase was rinsed four times with saturated sodium chloride solution, dried and evaporated to dryness. The residue was purified by precipitation. Three times the residue was dissolved in diethyl ether and precipitated in 20:1 hexane:ether to yield 3.53 g of final product (II) which by infrared, NMR, hydroxyl titration and redox potential exhibited properties consistant with the structure shown in Formula VIII

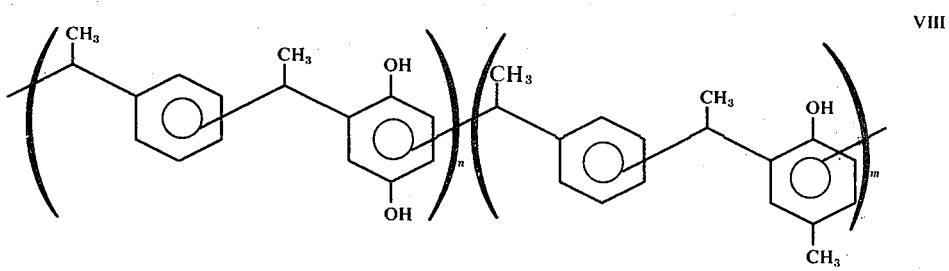

Molecular weight, determined by the method used in Example I, had a peak at 4,500 such that $n + m$ equals 17–19. Based on the proportions of p-cresol and hydroquinone fed, $n$ should equal 17–18 and $m$ should equal 1–2.

EXAMPLE III

Phenol (6.048 g, 64.4 mmoles), p-xylene (1 ml), and aluminum metal (0.099 g, 0.57 mmoles) were heated at 140° C for 4 hours to form aluminum phenolate. The mixture was cooled to room temperature and 10.7 of t-butylhydroquinone (64.4 mmoles), 20.5 g of 75% pure divinylbenzene (123 mmoles) and 24 ml of p-xylene were then added and the mixture heated to reflux (151°–153° C) and there maintained for 12 hours. It was cooled to room temperature to yield a viscous reaction mixture. This material was divided into two portions. One (product IIIa) was analyzed, the other (product IIIb) was heated for 6 hours at reflux. The products were worked up by extraction, drying, and precipitation according to the general method set out in Example II. The two materials exhibited properties, upon analysis, consistant with the structure shown in Formula IX

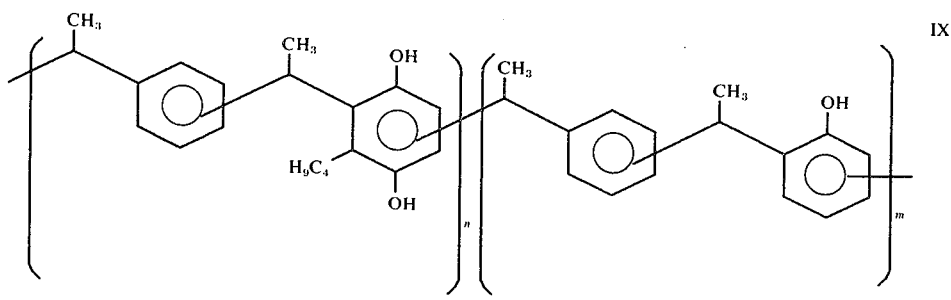

These analyses and molecular weight determinations indicated that for peak components of product IIIa, $n + m$ equals 20 while for peak components of product IIIb, $n + m$ equals 24. Based on feed ratios, it is expected that $n$ is about equal to $m$.

EXAMPLE IV

The general preparation of Example II was repeated varying the feed components to use the following:

| | |
|---|---|
| aluminum metal | 2 mmoles |
| p-cresol | 6.7 mmoles |
| t-butylhydroquinone | 53 mmoles |
| divinylbenzene | 60 mmoles |
| xylene | 15 ml |

The reaction temperature was 144°–146° C. The reaction time was about 22 hours. The reaction product (IV) had a molecular weight of 3,800 such that $n$ plus $m$ in Structural Formula IX had peak values of 14–16. As with all the products prepared by the process of this invention, there was a range of the values for $n$ and $m$.

EXAMPLE V

The General Preparation of Example II was repeated twice varying the ratios of feed components to the following:

| | Run Va | Run Vb |
|---|---|---|
| aluminum metal | 0.67 mmoles | 0.67 mmoles |
| p-cresol | 47.5 mmoles | 47.5 mmoles |
| hydroquinone | 2.5 mmoles | 2.5 mmoles |
| divinylbenzene | 37.5 mmoles | 43.8 mmoles |

The products which reulted following extraction and recovery were consistant with the structure of Formula VIII and had the following values for $n$ and $m$:

| Product | Va | Vb |
|---|---|---|
| n + m | 6–8 | 16–18 |

EXAMPLE VI p-ethylphenol (0.367 g, 3 mmoles), aluminum (0.018 g, 0.67 mmoles) and about 1 ml of xylene were heated at 160° C until the aluminum dissolved; additional xylene (20 ml) was added, the mixture was heated to reflux and methylhydroquinone (2.08 g, 17 mmoles) was added along with 5 ml of n-butyl ether. Next 2.60 g of pure divinylbenzene (17 mmoles) was added and the mixture was refluxed for about 18 hours. The reaction mixture was extracted with an ether/hydrochloric acid mixture. The organic phase was rinsed with saturated salt solution, dried, and evaporated to yield a product which by analysis was consistant with the structure

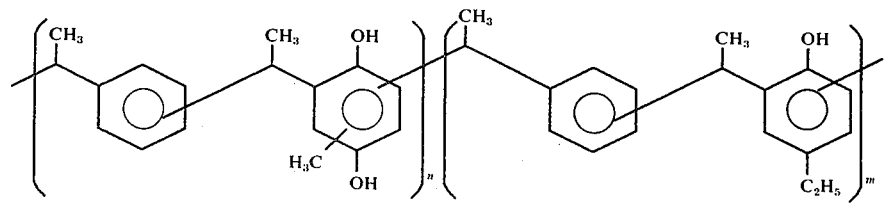

EXAMPLE VII

The reaction of hydroquinone and p-cresol with divinylbenzene following the general procedures of Example II was carried out several times varying the reactant ratios and reaction conditions. Products substantially as shown in Structural Formula VIII were formed. The reactions and their resulting products are given in Table I.

TABLE I

| RUN NO. | | REACTANTS Quantities, mmoles | | | | SOLVENTS | | |
|---|---|---|---|---|---|---|---|---|
| | | Divinyl-(1) benzene | Hydro- quinone | p-cresol | Aluminum | Solvent | ml | Diisopropyl ether, ml |
| VII | a | 37.4 | 30 | 6 | 1 | Xylene | 32 | 5 |
| | b | 37.4 | 30 | 6.1 | 1 | Xylene | 32 | 5 |

TABLE I-continued

| | | | | | | | | |
|---|---|---|---|---|---|---|---|---|
| | c | 18.8 | 16 | 3.1 | 0.5 | Xylene | 16 | 0 |
| | d | 18.8 | 15 | 6.6 | 1 | Xylene | 16 | 2.5 |
| | e | 34.2 | 23 | 14.2 | 1 | Xylene | 32 | 5 |
| | f | 34.2 | 30 | 3.1 | 0.5 | Mesitylene | 16 | 3.5[(3)] |
| | g | 17.2 | 15 | 3.1 | 0.5 | Mesitylene | 14 | 2.5 |

| RUN NO. | | CONDITIONS | | | PRODUCTS Molecular Weight | |
|---|---|---|---|---|---|---|
| | | Temp, °C | Preheat[(2)] Time, min | Reaction Time, hrs. | Crude | Precipitated |
| VII | a | 128 | 5 | 16 | | 1,700 |
| | b | 128 | 5 | 22 | 7,200 | 8,000 |
| | c | 145 | 10 | 22 | 2,800 | 3,500 |
| | d | 128 | 10 | 22 | 2,100 | 1,400 |
| | e | 128 | 30 | 22 | | 5,000 |
| | f | 128 | 30 | 22 | 6,400 | 4,500 |
| | g | 128 | 30 | 22 | 6,400 | 4,300 |

[(1)]75% pure - mmoles includes about 25% diethylbenzene, ethylvinylbenzene, etc.
[(2)]Time at temperature prior to adding divinylbenzene
[(3)]diethyl ether

EXAMPLE VIII

The reaction of t-butylhydroquinone and p-cresol with divinylbenzene following the general procedures of Example III was carried out several times varying reactant ratios and reaction conditions. Products substantially as shown in Structural Formula IX were formed. The reactions and their resulting products are given in Table II.

of peroxides in oils are a measure of the stability of oils. The slower the rate of peroxide value increase in oils with heating — the less prone to oxidation or more stabilized the oil is. (See for example, A.O.C.S. tentative method Cd 12–57 for more informtion on peroxides and oil stability). The test results as well as comparative results obtained with plain oil and with oil containing conventional antioxidants are given in Table III. These results show that the present products do

TABLE II

| RUN NO. | | REACTANT Quantities, mmoles | | | | SOLVENT (Xylene), ml | CONDITONS | | | PRODUCT Molecular Weight | |
|---|---|---|---|---|---|---|---|---|---|---|---|
| | | Divinyl-[(1)] benzene | t-butyl hydro- quinone | p-cresol | Aluminum | | Temp, °C | Preheat Time, min | Reaction Time, hrs | Crude | Purified |
| VIII | a | 16 | 15 | 2.8 | 0.5 | 15 | 145 | 60 | 20 | 1,900 | |
| | b | 37.3 | 30 | 3.4 | 1.0 | 15 | 145 | 120 | 23 | 4,500 | |
| | c | 68.5 | 15 | 45 | 2 | 15 | 145 | 5 | 22 | 4,100 | 3,200 |
| | d | 68.5 | 30 | 30 | 2 | 15 | 145 | 5 | 22 | 2,800 | 4,000 |
| | e | 68.5 | 45 | 15 | 2 | 42 | 145 | 30 | 22 | 1,500 | 2,600 |
| | f | 18.5 | 18[(2)] | 2 | 0.7 | 3 | 145 | 10 | 18 | 3,000 | |
| | g | 32[(3)] | 10 | 10 | 0.7 | 3 | 145 | — | 20 | 1,500 | 3,600 |
| | h | 29[(3)] | 10 | 10 | 0.7 | 3 | 145–150 | — | 20 | 1,500 | 2,400 |
| | i | 37.4 | 30 | 3.2 | 1.0 | 7.5 | 145 | 90 | 23 | — | 4,700 |

[(1)]75% pure - remainder approximately 20% ethylvinylbenzene, and inert hydrocarbons (5%)
[(2)]2,5-di-t-butylhydroquinone was used instead of mono-t-butylhydroquinone
[(3)]55% pure - remainder approximately 40% ethylvinylbenzene and inert hydrocarbon compounds (5%)

EXAMPLE IX

A principal utility of the products of this invention is as agents to inhibit the oxidation of substrates susceptible to oxidative attack. The activity as antioxidants of a number of the products prepared in Examples I through VIII was determined as follows: 50 ml of substrate (freshly opened Wesson[TM] Oil - a blend of cottonseed and soybean oils containing no additives and packed at the site of manufacture under nitrogen) containing 0.5 ml of benzene and 10 mg of a test material (200 ppm concentration) was placed in a 6 cm diameter by 8 cm high round glass jar and placed open in a forced air draft oven maintained at 80° C. A one ml sample was taken every 10–15 hours and analyzed for peroxide content by iodometric tritration.

The iodometric titration involved adding a constant amount of acetic acid - chloroform solution followed by a constant amount of potassium iodide and back titrating with sodium thiosulfate to a starch indicator endpoint in accordance with A.O.C.S. (American Oil Chemists Society) method Cd 8–53. It is generally regarded that peroxide content and the rate of build up exhibit substantial antioxidant activity.

TABLE III

| | MEQ Peroxide/Liter Hours | | | | |
|---|---|---|---|---|---|
| Test Material | 0 | 15 | 39 | 63 | 140 |
| Plain Oil | 1–2 | 7 | 20 | 32 | 90 |
| Oil + 200 ppm BHT | 1–2 | 7 | 16 | 27 | 65 |
| Oil + 200 ppm BHA | 1–2 | 6 | 17 | 28 | 65 |
| Oil + 200 ppm III b | 1–2 | 3 | 6 | 9 | 84 |
| Oil + 200 ppm V a | 1–2 | 7 | 18 | 29 | 65 |
| Oil + 200 ppm VII e | 1–2 | — | 5 | 8 | 50 |
| Oil + 200 ppm VII g | 1–2 | 2 | 6 | 9 | 46 |
| Oil + 200 ppm VIII a | 1–2 | 3 | 5 | 8 | 50 |
| Oil + 200 ppm VIII b | 1–2 | 3 | 5 | 12 | 58 |
| Oil + 200 ppm VIII c | 1–2 | 3 | 7 | 16 | 55 |
| Oil + 200 ppm VIII d | 1–2 | 2 | 5 | 10 | 55 |
| Oil + 200 ppm VIII e | 1–2 | 2 | 4 | 9 | 52 |

EXAMPLE X

The general preparation of Example II is repeated twice with variations.

A. In the first variation the 13 mmoles of divinylbenzene is replaced in the reaction mixture by 13 mmoles of 1,5-hexadiene such that the reaction product has the General Structure

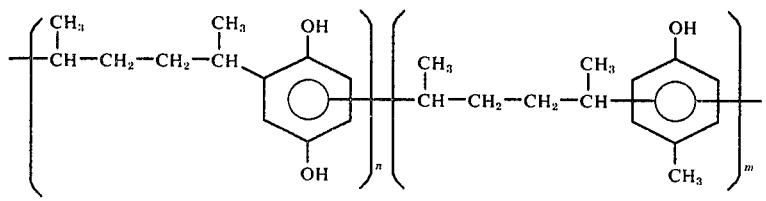

B. In the second variation, 1 mmole of zirconium phenoxide, prepared in accord with Example I of Leston's U.S. Pat. No. 3,331,879 issued July 18, 1967, is employed as catalyst. A reaction product in accord with the present Example II is obtained.

We claim:

1. A polymer comprising from about 3 to about 100 recurring hydroquinonoid structural units of the formula

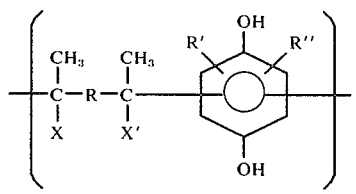

wherein X and X' independently are selected from the group consisting of hydrogen and methyl, R is a hydrocarbon selected from the group consisting of alkyls of from 1 to 6 carbons and aryls, aralkyls and alkaryls of from 6 to 14 carbon atoms and R' and R'' independently are selected from the group consisting of hydrogen, lower alkyls of from 1 to 6 carbon atoms, and aralkyls of from 8 to 12 carbon atoms.

2. The polymer of claim 1 further characterized as an essentially linear polymer having an average no more than about one branch for each four said hydroquinonoid structural units.

3. The polymer of claim 2 wherein R is phenylene and X and X' are hydrogens.

4. The polymer of claim 2 wherein R' is hydrogen.

5. The polymer of claim 3 wherein R' is hydrogen.

6. The polymer of claim 5 wherein R'' is hydrogen.

7. The polymer of claim 6 consisting essentially of said hydroquinonoid structural units.

8. The polymer of claim 5 wherein R'' is t-butyl or t-amyl.

9. The polymer of claim 8 consisting essentially of said hydroquinonoid structural units.

10. The polymer of claim 2 additionally comprising recurring phenolic structural units of the formula

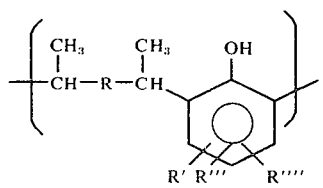

wherein R''' is independently selected from the group consisting of hydrogen, lower alkyls of from 1 to 6 carbon atoms and aralkyls of from 8 to 12 carbon atoms and R'''' is independently selected from the group consisting of hydrogen and lower alkyls of from 1 to 6 carbon atoms and wherein there is, on average, for each hydroquinonoid structural unit not more than 1 phenolic structural unit.

11. The polymer of claim 10 wherein R is phenylene and R' is hydrogen.

12. The polymer of claim 11 wherein R''' is hydrogen.

13. The polymer of claim 12 wherein R'' is hydrogen and R'''' is hydrogen.

14. The polymer of claim 12 wherein R'' is hydrogen and R'''' is methyl and said R'''' is positioned para to the phenolic OH moiety.

15. The polymer of claim 12 wherein R'' is t-butyl and R'''' is hydrogen.

16. The polymer of claim 12 wherein R'' is t-butyl and R'''' is methyl and said R'''' is positioned para to the phenolic OH moiety.

17. The process for preparing a hydroquinonoid polymer which comprises intimately contacting a diolefinically unsaturated hydrocarbon of the formula

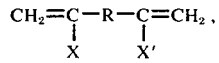

wherein X and X' independently are hydrogen or methyl groups, R is a hydrocarbon selected from the group consisting of alkyls of from 1 to 6 carbons aryls, alkaryls and aralkyls of from 6 to 14 carbon atoms, with a hydroquinonoid of the formula

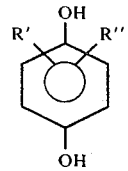

wherein R' and R'' independently are selected from the group consisting of hydrogen, lower alkyls of from 1 to 6 carbon atoms and aralkyls of from 8 to 12 carbon atoms and optionally a phenolic of the formula

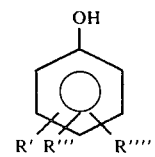

wherein R''' is a member selected from the group consisting of hydrogen, lower alkyls of from 1 to 6 carbon atoms and aralkyls of from 8 to 12 carbon atoms, in the presence of a catalytically effective amount of a hydroxyaromatic ortho alkylation catalyst and effecting ortho-alkylation reaction under suitable reaction conditions.

18. The process of claim 17 wherein said diolefinically unsaturated hydrocarbon is present in an amount of from ½ to 2 moles per mole of hydroquinonoid and said catalyst is present in an amount of from 0.001 to 0.1 moles per mole of diolefinically unsaturated hydrocarbon.

19. The process of claim 18 wherein the conditions for effecting reaction comprise a reaction time of from 1 to 20 hours, a reaction temperature of from 80° C to 250° C, an organic liquid reaction solvent in an amount such as to yield maximum concentration of diolefinically unsaturated hydrocarbon of from about 0.1 to about 20 moles per liter of solvent.

20. The process of claim 19 wherein said catalyst comprises aluminum.

21. The process of claim 18 wherein said phenolic is present in an amount of from about 0 to about 10 moles per mole of hydroquinonoid and said diolefinically unsaturated hydrocarbon is present in an amount of from about ½ to 2 moles per mole of hydroquinonoid plus phenolic.

22. The process of claim 21 wherein the mole ratio of hydroquinonoid to phenolic reactants is maintained between about 10:1 and about 1:1.

23. An oxidizing substance selected from the group consisting of plastics, rubbers and deterioration-prone foodstuffs stabilized against oxidation by containing an intimate admixture therewith an effective amount of from 2 to 50,000 parts per million, basis oxidizable substance, of the polymer of claim 10.

24. The process of stabilizing an oxidizable substance selected from the group consisting of plastics, rubbers, and deterioration-prone foodstuffs which comprises adding to said substance an effective stabilizing amount in the range of from 2 to 50,000 parts per million of the polymer of claim 10.

* * * * *